United States Patent [19]

Suzuki et al.

[11] Patent Number: 4,989,026
[45] Date of Patent: Jan. 29, 1991

[54] BIFOCAL CAMERA

[75] Inventors: Tatsuya Suzuki, Tokyo; Shunji Matsutani, Hachioji, both of Japan

[73] Assignee: Olympus Optical Co., Ltd., Tokyo, Japan

[21] Appl. No.: 496,967

[22] Filed: Mar. 21, 1990

[30] Foreign Application Priority Data

Apr. 3, 1989 [JP] Japan .................................. 1-84441
Apr. 3, 1989 [JP] Japan .................................. 1-84442

[51] Int. Cl.$^5$ ........................... G03B 1/00; G03B 3/00
[52] U.S. Cl. ................................ 354/150; 354/195.12; 354/212
[58] Field of Search ................... 354/195.12, 150, 212

[56] References Cited

U.S. PATENT DOCUMENTS

| | | | |
|---|---|---|---|
| 4,527,874 | 7/1985 | Ohmura | 354/195.12 |
| 4,564,278 | 1/1986 | Ohmura | 354/195.12 |
| 4,609,270 | 9/1986 | Kohno et al. | 354/195.12 |
| 4,655,571 | 4/1987 | Ohmura et al. | 354/150 |
| 4,772,903 | 9/1988 | Labaziewicz | 354/195.12 |

*Primary Examiner*—Michael L. Gellner
*Attorney, Agent, or Firm*—Frishauf, Holtz, Goodman & Woodward

[57] ABSTRACT

A bifocal camera includes a first and second photographic optical systems which have focal lengths different from each other. A stationary mirror is arranged on the optical axis of the first optical system, and an exposure opening is positioned on the optical axis of the second optical system. A movable mirror is arranged to be movable between first and second positions. At the first position, the movable mirror interrupts incident light beams from the second optical system and guides incident light beams, which are passed through the first optical system and reflected by the stationary mirror, to the exposure opening. At the second position, the movable mirror interrupts the light beams reflected by the stationary mirror and allows the incident light beams form the second optical system to be made incident to the exposure opening. The movable mirror is shifted to the second position by a switching mechanism when a film is to be transferred along the exposure opening.

16 Claims, 12 Drawing Sheets

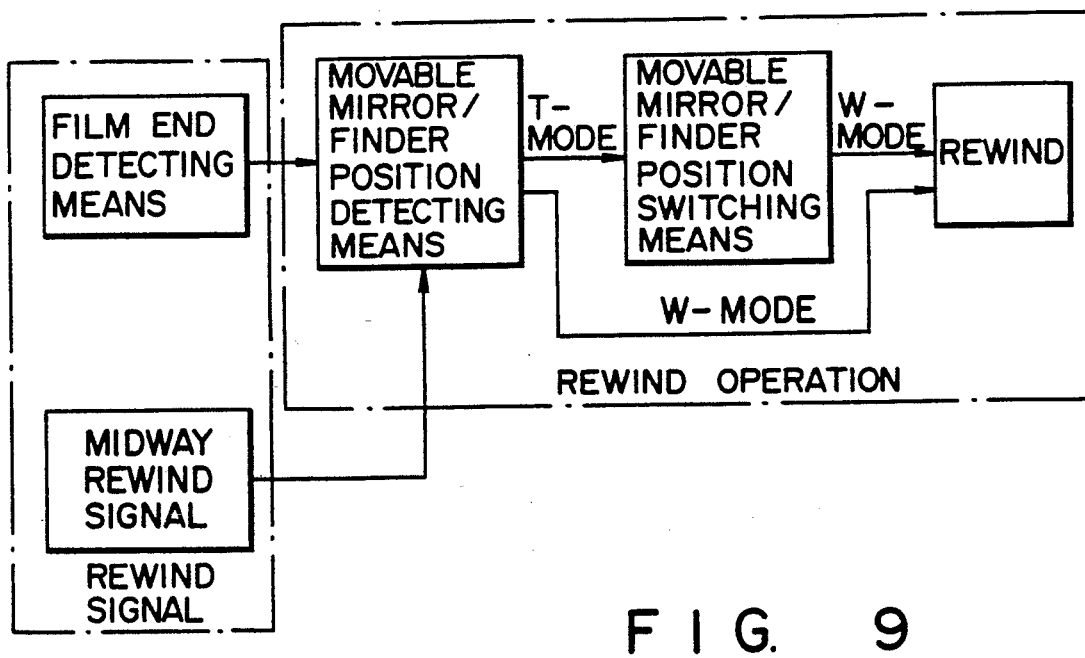
F I G. 9
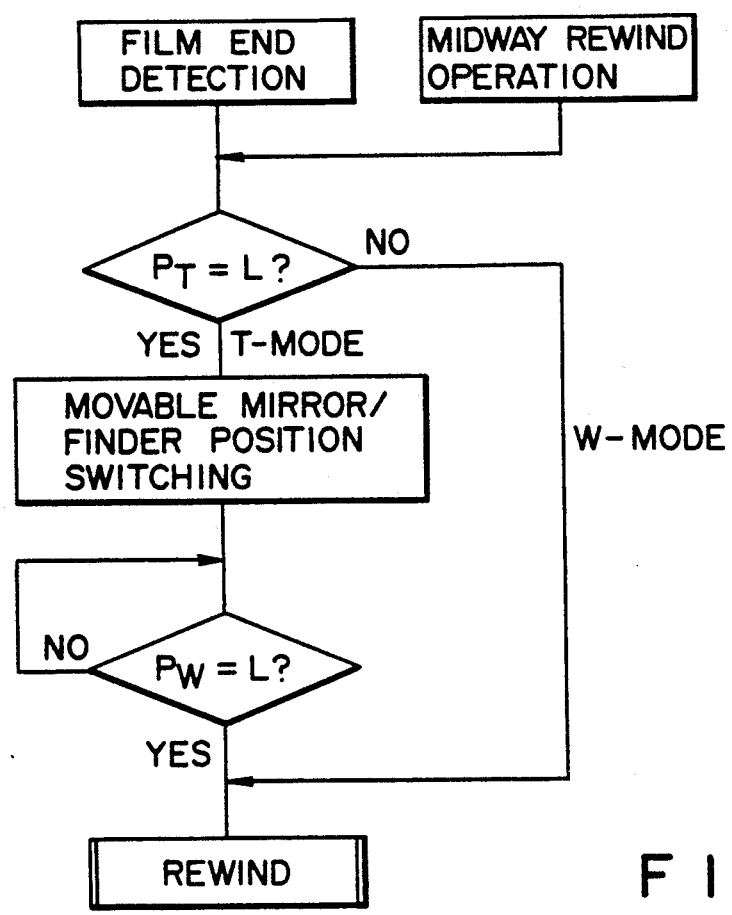
F I G. 10

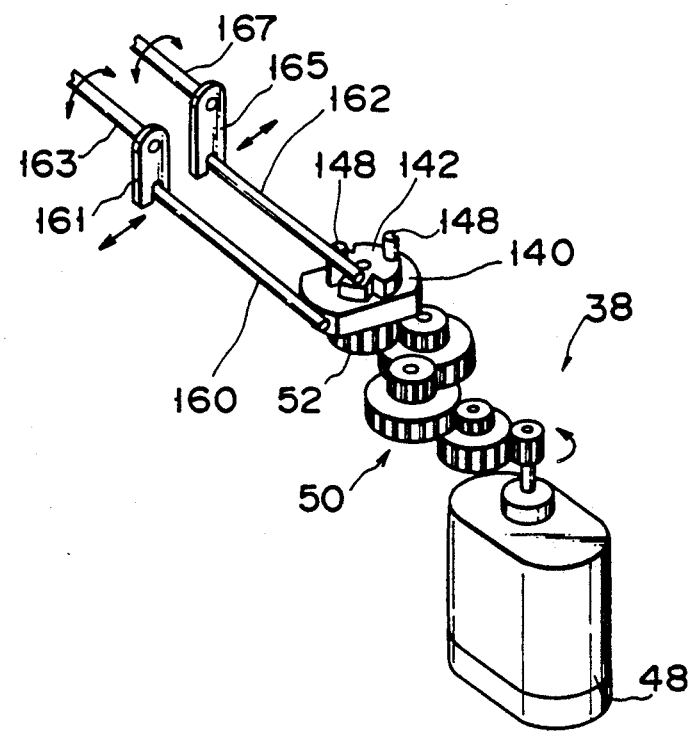
F I G. 15
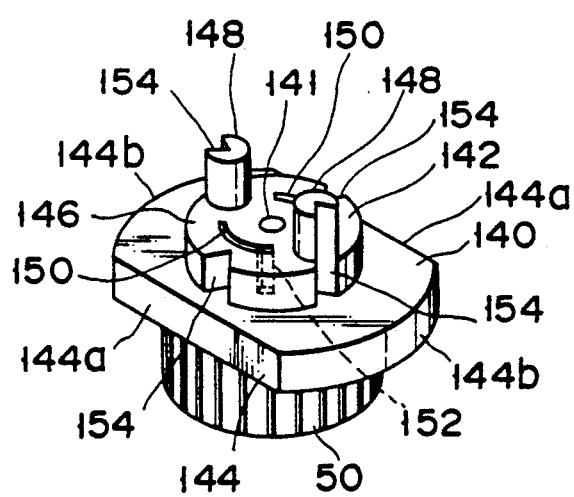
F I G. 16

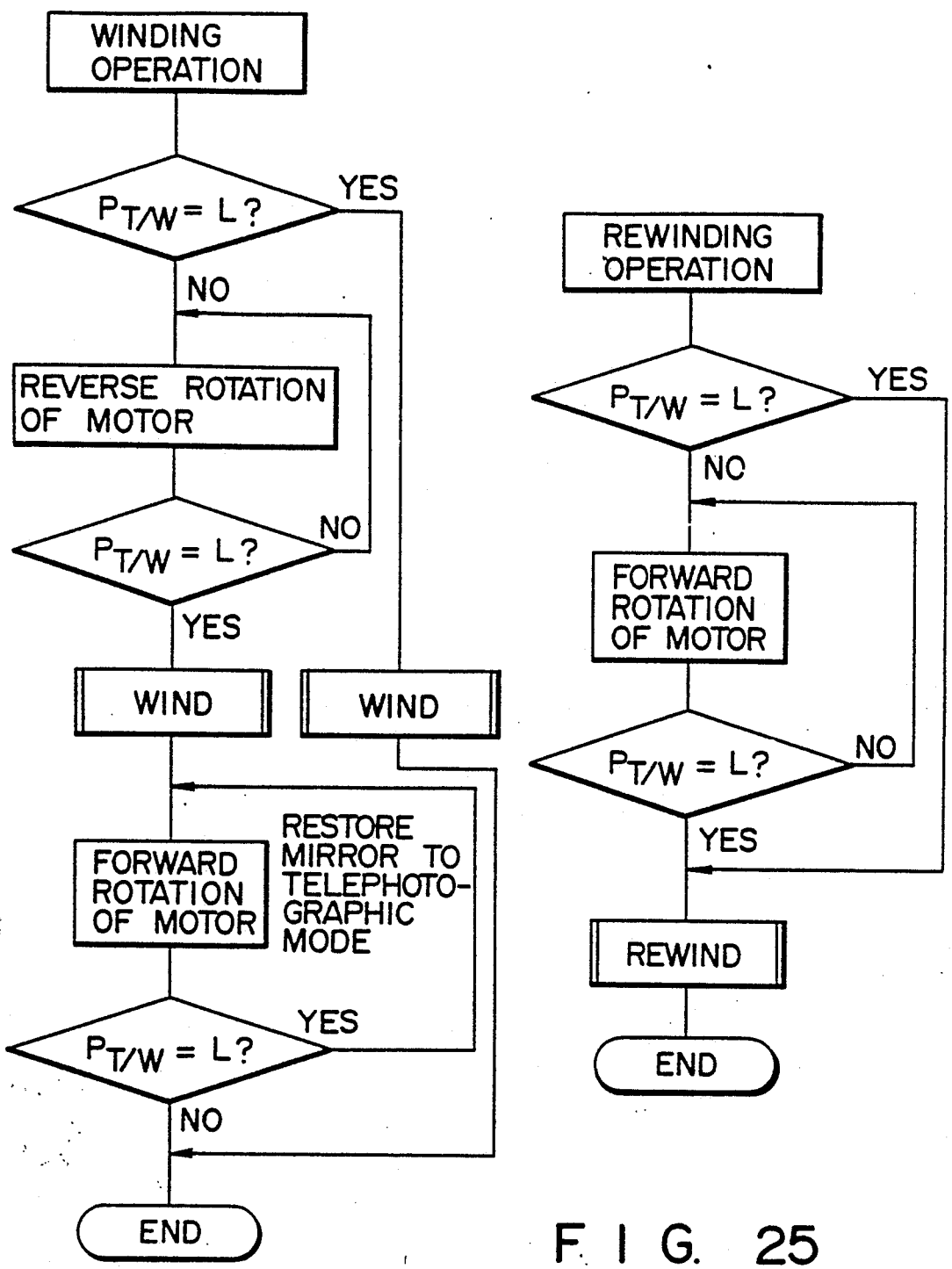
F I G. 23
F I G. 25

BIFOCAL CAMERA

BACKGROUND OF THE INVENTION

1. Field of the Invention

The present invention relates to a camera, such as a bifocal camera having a telephotographic lens and a wide-angle photographic lens, wherein a light beam passed through the photographic lens is guided onto a film by means of an optical path changing member such as a reflecting mirror.

2. Description of the Related Art

There is provided, for example, a bifocal camera having within its body a telephotographic lens and a wide-angle photographic lens which are arranged in parallel to each other and can be selectively used for photographing, as a camera wherein a photographic light beam passed through the photographic lens is guided onto a film by means of a light-passage changing member such as a reflecting mirror. In general, this type of camera includes a stationary mirror provided on an optical axis of the telephotographic lens, an exposure opening positioned on an optical axis of the wide-angle photographic lens, and a movable mirror. The lenses are switched over from each other by moving the movable mirror between a telephotographic position wherein the movable mirror is situated on the optical axis of the wide-angle photographic lens and a wide-angle position wherein the movable mirror is retreated from the optical axis of the wide-angle photographic lens.

The camera having the above-mentioned structure, however, has the following problem: in the case where a rear cover of the camera body is opened to take out or insert a film while the movable mirror is situated in the telephotographic position, that is, the reflecting surface of the mirror faces the exposure opening, dust particles or the like may enter the camera body through the exposure opening and adhere to the reflecting surface of the movable mirror. In this case, good photographing cannot be performed.

According to a bifocal camera disclosed, for example, in U.S. Pat. No. 4,772,903, the movable mirror is shifted to the wide-angle position when the rear cover of the camera body is opened, whereby the reflecting surface of the movable mirror is protected against dust particles or the like.

The bifocal camera of the aforementioned U.S. Patent, however, has a problem mentioned below.

When a film is rewound while the movable mirror is situated in the telephotographic position, dust particles or the like adhered to the film enter the camera body through the exposure opening and adhere to the reflecting surface of the movable mirror. In addition, when the film is rewound, it slides on a film guide at high speed. Thus, emulsion coated over the film is peeled therefrom, and the peeled emulsion enters through the exposure opening and adheres to the reflecting surface of the movable mirror. As a result, good photographing is not carried out.

Moreover, an end portion of a film is normally curled inwards. Consequently, when the rewinding of the film is nearly completed, the end portion of the film may project into the camera body through the exposure opening as it passes over the exposure opening. In this situation, if the movable mirror is located in the telephotographic position, the reflecting surface of the mirror may be scarred by the end portion of the film projecting into the camera body. If the reflecting surface of the mirror is scarred, good photographing cannot be performed.

SUMMARY OF THE INVENTION

The present invention has been made in consideration of the above circumstances, and its object is to provide a camera of the type wherein a photographic light beam passed through a photographic optical system is guided onto a film by means of an optical path changing member, wherein the optical path changing member is surely protected from contamination and damage, and excellent photographing is ensured for a long period of time.

In order to achieve the above object, the camera of the present invention includes switching means for retreating the changing member from the front of the film when the film is being transferred.

Another object of the present invention is to provide a bifocal camera wherein a movable mirror is surely protected from contamination and damage, and excellent photographing is ensured for a long period of time.

In order to achieve this object, the bifocal camera of this invention includes movable mirror switching means, interlocked with a transfer of the film, for shifting the movable mirror to a wide-angle photographic position where a reflecting surface of the movable mirror retreats from the front of an exposure opening.

According to this structure, while the film is being transferred, the movable mirror is kept in the position where its reflecting surface retreats from the front of the exposure opening. Thus, while the film is being transferred, the reflection surface of the movable mirror is protected from contamination and damage.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention;

FIGS. 1 to 10 show a bifocal camera according to a first embodiment of the present invention, in which:

FIG. 1 is a cross-sectional view of the camera;

FIG. 2 is a perspective view showing a finder mechanism and a switching mechanism of the camera;

FIG. 3 is a perspective view showing the finder mechanism and the switching mechanism in the operation mode different from that in FIG. 2;

FIG. 4 is a side view schematically illustrating the switching mechanism in the telephotographing mode;

FIG. 5 is a side view schematically illustrating the switching mechanism in the wide-angle photographing mode;

FIGS. 6 and 7 are a side view and a top view illustrating a positional relationship between a position detecting switch and a cam;

FIG. 8 is a block diagram schematically illustrating the overall structure of the camera; and FIGS. 9 and 10 are flow charts for explaining the film rewinding operation in the camera.

FIGS. 11 to 14 show a bifocal camera according to a second embodiment of the invention, in which:

FIGS. 11 to 13 are cross-sectional views for schematically illustrating three different operation states of the camera; and FIG. 14 is a flow chart for explaining the film rewinding operation of the camera.

FIGS. 15 to 25 show a bifocal camera according to a third embodiment of the invention, in which:

FIG. 15 is a perspective view showing a switching mechanism of the camera;

FIG. 16 is an enlarged perspective view of first and second cams;

FIGS. 17 to 19 are plan views illustrating three different operation states of the switching mechanism;

FIG. 20 is a block diagram schematically showing the overall structure of the camera;

FIG. 21 is a flow chart for explaining the switching operation for a movable mirror and a finder;

FIGS. 22 and 23 are flow charts for explaining the film winding operation; and

FIGS. 24 and 25 are flow charts for explaining the film rewinding operation.

DETAILED DESCRIPTION OF THE PREFERRED EMBODIMENTS

Embodiments of the present invention will now be described in detail with reference to the accompanying drawings.

Figure 1:
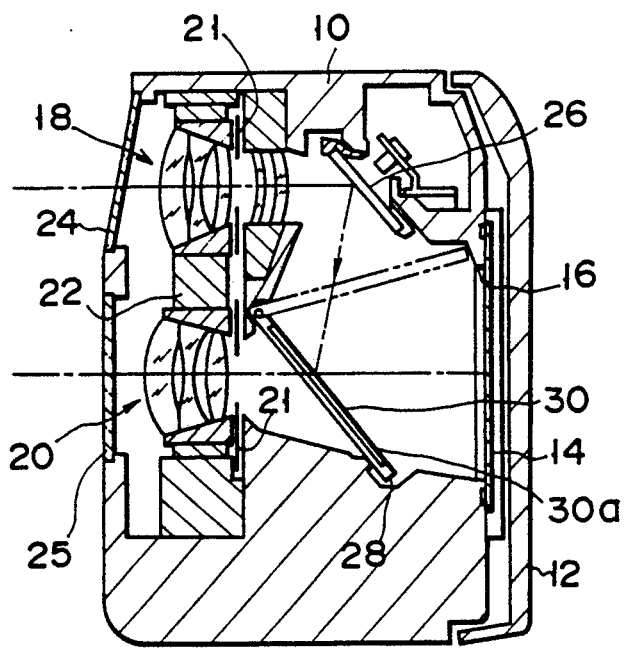

FIGS. 1 to 8 show a bifocal camera according to a first embodiment of the present invention. As shown in FIG. 1, the camera comprises a camera body 10 having an openable rear cover 12. By opening the rear cover 12, a film can be mounted in or taken out of the camera body 10. A film 14, when mounted in the camera body 10, is positioned so as to cover one end of an exposure opening 16 formed in the camera body.

The camera body 10 includes a first photographic optical system 18 having a relatively long focal length and used for telephotographing, and a second photographic optical system 20 having a relatively short focal length and used for wide-angle photographing. The second photographic optical system 20 is arranged such that its optical axis coincides with the center of the exposure opening 16 and intersects the plane of the film 14 at right angles. The first photographic optical system 18 is arranged above the second photographic optical system 20, such that their optical axes extend in parallel to each other. The optical systems 18 and 20 are supported by a support frame 22 to be movable along their optical axes. Transparent glass windows 24 and 25 are provided in front of the first and second photographic optical systems 18 and 20. Shutters 21 are provided, respectively, in the first photographic optical system 18 and in rear of the second photographic optical system 18.

A stationary mirror 26 is arranged in rear of the first photographic optical system 18 in the camera body 10. The stationary mirror 26 is positioned in the optical axis of the optical system 18 with being included to the optical axis. A movable mirror 30, fixed on a support plate 28, is also provided within the camera body 10. One end portion of the support plate 28 is rotatably supported by the camera body 10. The movable mirror 30, along with the support plate 28, can be rotated between a first position indicated by a solid line in FIG. 1 and a second position indicated by a two-dots and dashed line.

In the first position, the movable mirror 30 is inclined in respect of the optical axis of the second photographic optical system 20, and its reflecting surface 30a faces the exposure opening 16 and the stationary mirror 26. The movable mirror 30 guides an optical image, which has entered the camera body 10 through the first photographic optical system 18 and has been reflected by the stationary mirror 26, through the exposure opening 16 onto the film 14. Thus, telephotography using the first photographic optical system 18 can be performed. In the second position, the movable mirror 30 retreats from the optical axis of the second photographic optical system 20, and also its reflecting surface 30a retreats from the front of the exposure opening 16 and shuts off an optical path of an optical image reflected by the stationary mirror 26. Thus in place of the optical image input through the first photographic optical system 18, the optical image input to the camera body 10 through the second photographic optical system 20 is guided onto the film 14 through the exposure opening 16. As a result, wide-angle photography using the second photographic optical system 20 can be performed.

In this manner, the movable mirror 30 is switched between the first and second positions, whereby the telephotography or wide-angle photography can be selectively performed.

Figure 2:
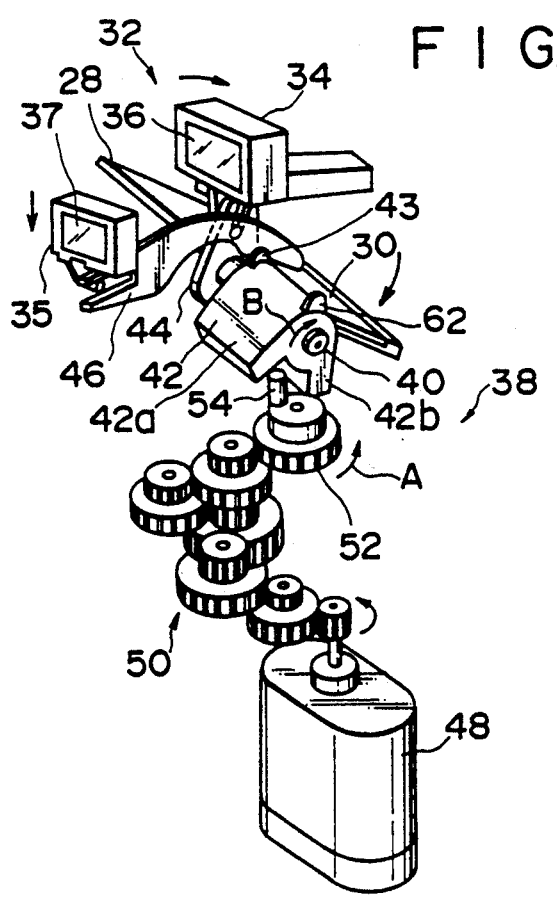

As shown in FIG. 2, the bifocal camera comprises a finder mechanism 32 which is switched in cooperation with the rotation of the movable mirror 30. The finder mechanism 32 has first and second lens groups 36 and 37 held by first and second frames 34 and 35, respectively. The first and second frames 34 and 35 are guided to be movable in horizontal and vertical directions (in FIG. 2) by a guide mechanism (not shown). The finder mechanism 32 and movable mirror 30 are switched in interlock with each other by means of a switching mechanism 38.

Figure 4:
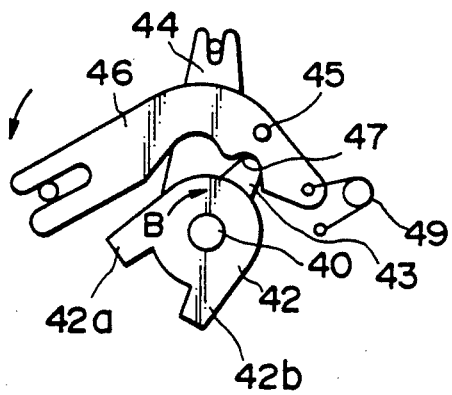
Figure 5:
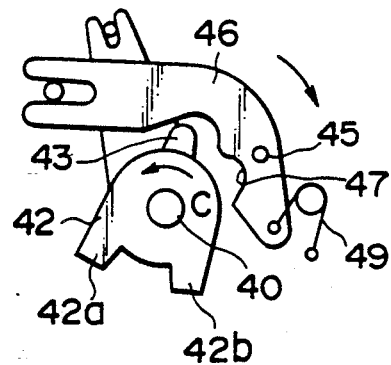

As shown in FIGS. 2, 4 and 5, the switching mechanism 38 has a rotational shaft 40 rotatably supported by the camera body 10. The shaft 40 is coupled to the support plate 28 of the movable mirror 30 and is rotatable along with the support plate 28. A V-shaped cam 42 having a pair of legs 42a and 42b is secured to the shaft 40 and is rotated along with the shaft 40. A first projection 43 is formed on an upper end of the cam 42. Also, a first rotational arm 44 is secured to the shaft 40, and an end portion of the arm 44 is engaged with the first frame 34 of the finder mechanism 32. A second rotational arm 46, which is rotatably supported by a shaft 45 secured to the camera body 10, is provided near the first rotational arm 44. The arm 46 has an engagement recess 47 which is open towards the cam 42 and engageable with the projection 43 of the cam. An end portion of the arm 46 is engaged with the second frame 35, and a toggle spring 49 is stretched between a rear end of the arm 46 and the camera body. The rotational arms 44 and 46 are rotated in predetermined directions in accordance with the rotation of the shaft 40.

The switching mechanism 38 comprises a switching motor 48, and a drive gear 52 rotated by the switching motor 48 via a gear row 50. The drive gear 52 is located under the cam 42, and has a push pin 54 which is engageable with the legs 42a and 42b of the cam. For example, in FIG. 2, when the drive gear 52 is rotated in the direction of arrow A, the push pin 54 contacts the legs 42a and 42b of the cam 42 alternately, and rotates the cam 42 in opposite directions by predetermined degrees.

FIG. 2 and FIG. 4 show the state wherein the movable mirror 30 and the finder mechanism 32 are set in the telephotographic mode (T-mode). Namely, the push pin 54 of the drive gear 52 is put in contact with the leg 42a of the cam 42 and rotates the cam 42 in the direction of arrow B by a predetermined degree. The support plate 28 and the movable mirror 30 are rotated integrally with the rotational shaft 40 and, thus, the movable mirror is bought in the first position. The first frame 34 of the finder mechanism 32 is shifted to the position shown in FIG. 2, by the first rotational arm 44 that is rotated along with the shaft 40. The second arm 46 is pushed by the first projection 43 of the cam 42, and is rotated counterclockwise about the shaft 45. By virtue of the urging force of the toggle spring 49, the arm 46 is held at a position where the engagement recess 47 is in engagement with the projection 43. Thus, the second frame 35 of the finder mechanism 32 is shifted by the second arm 46 to the position shown in FIG. 2. In the telephotographic mode, only the first lens group 36 in the finder mechanism 32 is used.

Figure 3:
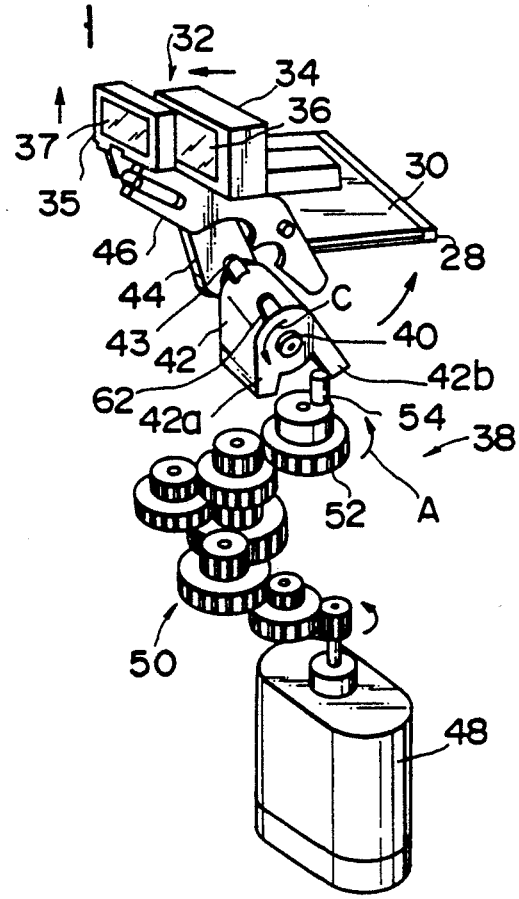

When the drive gear 52 is rotated by about 180° in the direction of arrow A, from the telephotographic state shown in FIG. 2, the push pin 54 pushes the leg 42b of the cam 42 and rotates the cam by a predetermined angle in the direction of arrow C, as shown in FIGS. 3 and 5. In this case, the rotational shaft 40 and the cam 42 rotate as one body integral with each other, and the movable mirror 30 along with the support plate 38 is rotated to the second position. Also, in accordance with the rotation of the shaft 40, the first arm 44 rotates in the direction of arrow C. Consequently, the first lens group 36 of the finder mechanism 32 is moved to the left (in FIG. 3). The second arm 46 is pushed by the first projection 43 of the cam 40 and is rotated clockwise about the shaft 45. Then, by virtue of the urging force of the toggle spring 49, the second arm 46 is kept in the position shown in FIG. 3. The second lens group 37 is moved upwards in FIG. 3. As a result, the movable mirror 30 and the finder mechanism 32 are switched to the wide-angle photographic mode (W-mode) shown in FIG. 3. In this mode, the optical axes of the first and second lens groups 36 and 37 coincide with each other, and they are used in combination.

If the drive gear 52 is rotated about 180° in the direction of arrow A, from the wide-angle photographic mode, the push pin 54 pushes the leg 42a of the cam 42. The cam 42 is thus rotated by a predetermined angle in the direction of arrow B. Therefore, the movable mirror 30 and the finder mechanism 32 are switched to the telephotographic mode shown in FIG. 2 once again.

Figure 6:
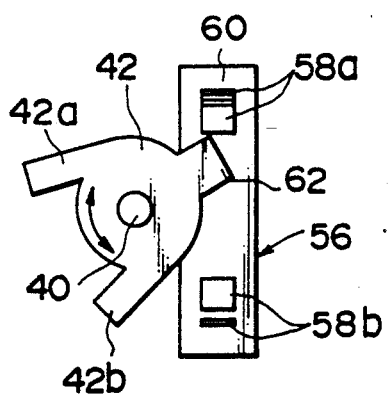
Figure 7:
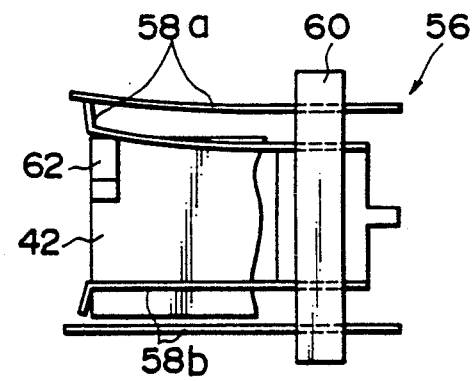

As shown in FIGS. 6 and 7, a position detecting switch 56 for detecting the state (i.e. position) of the finder mechanism 32 and the movable mirror 30 is provided above the cam 42. The switch 56 comprises a pair of first terminals 58a and a pair of second terminals 58b. These terminals are attached to a support member 60 and are arranged in parallel to each other. The cam 42 has a second projection 62 which is located between the first terminals 58a and the second terminals 58b. When the cam 42 rotates to the position to set the movable mirror 40 and the finder mechanism 32 to the telephotographic mode, the second projection 62 pushes one of the first terminals 58a towards the other, thereby closing the first terminals. When the cam 42 rotates to the position to set the movable mirror 30 and the finder mechanism 32 to the wide-angle photographic mode, the second projection 62 pushes one of the second terminals 58b towards the other, thereby closing the second terminals 58b. The position of the movable mirror 30 and the finder mechanism 32 is found by detecting the closing of the first and second terminals 58a and 58b.

Figure 8:
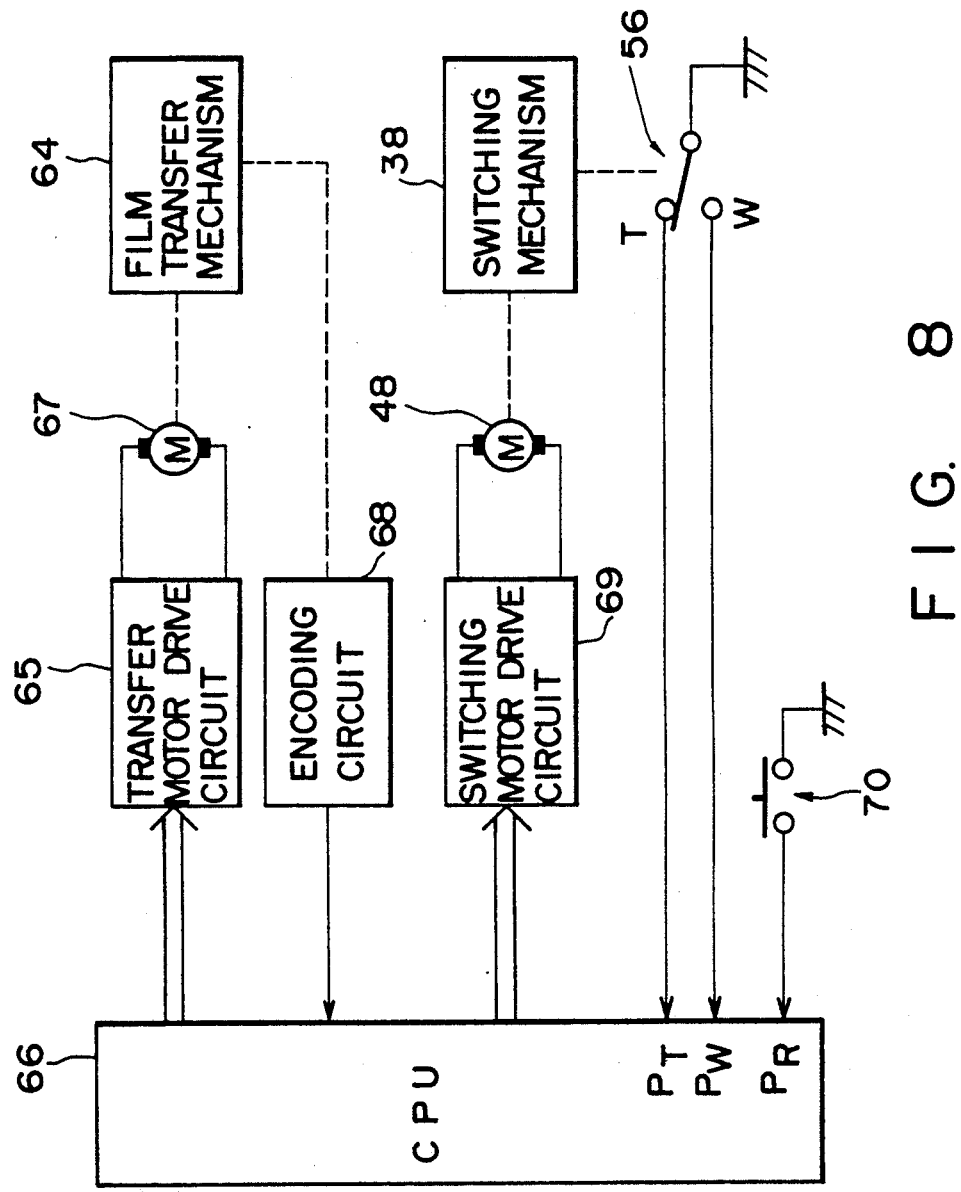

FIG. 8 is a block diagram showing the overall structure of the bifocal camera. The camera has a film transfer mechanism 64 for winding/rewinding the film 14. Upon receiving control signals (a winding signal and a rewinding signal) from a CPU 66, a transfer motor drive circuit 65 drives a transfer motor 67 of the film transfer mechanism 64. An encoding circuit 68 generates a transfer pulse corresponding to the transfer distance of the film, and inputs the generated pulse to the CPU 66. A switching motor drive circuit 69, upon receiving a switching signal from the CPU 66, drives a switching motor 48 of the switching mechanism 38. When the first terminals 58a of the position detecting switch 56 are closed, a port PT of the CPU 66 is set in a low level (L). When the second terminals 58b are closed, a port PW of the CPU 66 is set in a low level (L). Further, when a midway-rewinding switch 70 (for rewinding the film which has not completely taken up) provided on the outer surface of the camera body 10 is closed, a port PR of the CPU 66 is set in a low level. The switching mechanism 38, CPU 66 and switching motor drive circuit 69 constitute movable mirror switching means for shifting the movable mirror 30 to the second position when a film-rewinding operation (described later) is started.

The operation of the bifocal camera having the above structure will now be described.

The switching of the movable mirror 30 and finder mechanism 32 is normally effected by depressing a change-over switch (not shown) provided on the outer surface of the camera body 10. When the change-over switch is depressed, the CPU 66, upon receiving a detection signal from the position detecting switch 56, detects the position of the movable mirror 30 and finder mechanism 32 and supplies a switching signal to the switching motor drive circuit 69. Consequently, the switching mechanism 38 switches the mode of the movable mirror 30 and finder mechanism 32 from the telephotographic mode to the wide-angle photographic mode, and vice versa. Then, the CPU 66 detects the position of the movable mirror 30 and finder mechanism 32 once again on the basis of a detection signal from the position detecting switch 56. Thus, the switching operation is completed.

The film-rewinding operation will now be described. FIGS. 9 and 10 are flow charts for explaining the film-rewinding operation.

When a predetermined number of frames of the film 14 have been used and the terminal end of the film is detected by a conventional film end detecting means, the CPU 66 detects the position of the movable mirror 30 and the finder mechanism 32, on the basis of a detection signal from the position detecting switch 56. If the movable mirror 30 and finder mechanism 32 are set in the telephotographic mode, that is, if port PT=L, the mode of the movable mirror and finder mechanism are switched to the wide-angle photographic mode by the switching mechanism 38. Thus, the position of the movable mirror 30 is switched from the first position to the second position. Then, on the basis of a detection signal from the position detecting switch 56, the CPU 66 detects the position of the movable mirror 30 and finder mechanism 32 once again. After it is confirmed that the movable mirror 30 and finder mechanism 32 are set in the wide-angle photographic mode, i.e. PW=L, the rewinding of the film 14 is started by means of the film transfer mechanism 64.

If the movable mirror 30 and finder mechanism 32 are set in the wide-angle photographic mode when the terminal end of the film 14 is detected, the rewinding of the film 14 is immediately started without changing the mode.

On the other hand, when the midway-rewinding switch 70 is depressed while non-used frames are remaining in the film 14, the CPU 66 detects the position of the movable mirror 30 and finder mechanism 32 on the basis of the detection signal from the position detecting switch 56. If the movable mirror 30 and finder mechanism 32 are in the telephotographic mode, the CPU 66 changes this mode to the wide-angle photographic mode and thereafter starts the rewinding of the film 14. In this case, if the movable mirror 30 and finder mechanism are in the wide-angle mode, the rewinding is started without changing the mode.

For example, when the rear cover 12 of the camera body 10 is opened to take out or replace the film 14, the movable mirror 30 and finder mechanism 32 are set to the wide-angle photographic mode by conventional holding means, in interlock with the opening of the rear cover 12.

According to the above-described bifocal camera, when the movable mirror 30 is in the telephotographic mode as the film rewind operation is to be started, that is, when the movable mirror is situated in the first position, the mode of the movable mirror 30 is automatically switched to the wide-angle photographic mode. Thus, while the film is being rewound, the movable mirror 30 is kept at its second position wherein the reflecting surface 30a thereof is retreated from the front of the exposure opening 16. Thus, even if dust particles or the like on the film or emulsion peeled from the film enter the camera body 10 through the exposure opening 16 while the film is being wound, the reflecting surface 30a of the movable mirror 30 is surely protected from such a contaminant. In addition, even if an end portion of the film projects into the camera body 10 through the exposure opening 16 when the rewind of the film is nearly completed, the end portion of the film does not contact the reflection surface 30a of the movable mirror 30. Therefore, damage to the movable mirror can be surely prevented.

As has been described above, according to the bifocal camera of the first embodiment, excellent photographing is ensured for a long time.

FIGS. 11 to 14 show a bifocal camera according to a second embodiment of the present invention. With this embodiment, the camera has a movable mirror switching mechanism for switching the movable mirror in cooperation with the film transfer mechanism. In the second embodiment, the same structural elements as in the first embodiment are denoted by the same reference numerals, and detailed descriptions thereof will be omitted.

Figure 11:
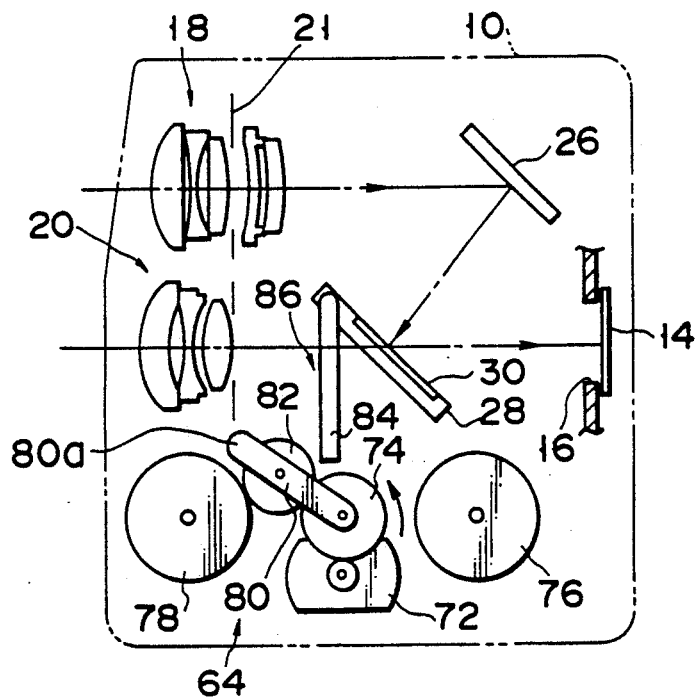

As shown in FIG. 11, the film transfer mechanism 64 has a transfer motor 72, and a drive gear 74 rotated by the transfer motor 72. A rewind gear 76 and a wind gear 78 are separately arranged on both sides of the drive gear 74. One end portion of a rotational arm 80 is rotatably attached to the rotation shaft of the drive gear 74. A planet gear 82 is rotatably supported on a middle portion of the rotational arm 80. The planet gear 82 is meshed with the drive gear 74. A distal end portion 80a of the rotational arm 80 extends beyond the periphery of the gear 82.

The planet gear 82 and the rotational arm 80 are rotated about the rotation shaft of the drive gear 74, in accordance with the rotation of the drive gear 74. More specifically, when the drive gear 74 is rotated counterclockwise by means of the transfer motor 72, the planet gear 82 is rotated counterclockwise along with the rotational arm 80, as shown in FIG. 11, and is set in the winding position where the gear 82 is meshed with the wind gear 78. Thus, the driving force of the transfer motor 72 is transmitted to the wind gear 78 through the drive gear 74 and the planet gear 82, and the film is wound up.

Figure 13:
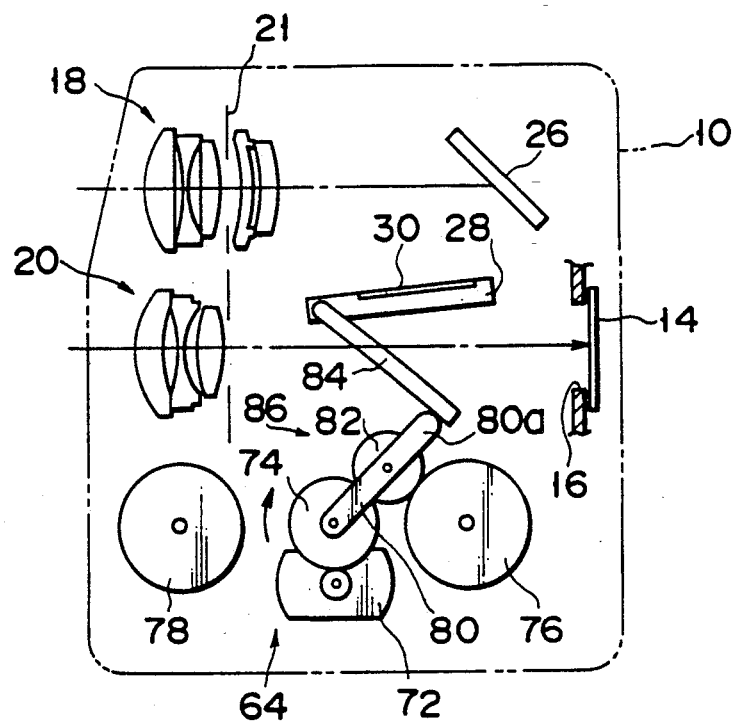

When the drive gear 74 is rotated clockwise by means of the transfer motor 72, the planet gear 82 is rotated clockwise along with the rotational arm 80, as shown in FIG. 13, and is set in the rewinding position where the gear 82 is meshed with the rewind gear 76. Thus, the driving force of the transfer motor 72 is transmitted to the rewind gear 76 through the gears 74 and 82, and the film is rewound.

One end portion of an interlocking arm 84 is attached to the support plate 28 of the movable mirror 30. The interlocking arm 84 extends from the support plate 28 to the rear side of the movable mirror 30. The interlocking arm 84 is located in a movement path of the rotational arm 80 of the film transfer mechanism 64, and is engageable with the distal end portion 80a of the rotational arm 80. When the planet gear 82 and the rotational arm 80 are rotated from the winding position to the rewinding position while the movable mirror 30 is in the first position (in FIG. 11), the distal end portion 80a of the rotational arm 80 pushes and rotates the interlocking arm 84 and shifts the movable mirror 30 from the first position to the second position. While the rotational arm 80 and the epicyclic gear 82 are in the rewinding position, the interlocking arm 84 is held by the rotational arm in the state shown in FIG. 13, that is, in the state wherein the movable mirror 30 remains in the second position.

As described above, the interlocking arm 84, rotational arm 80 and planet gear 82 constitute a movable mirror switching mechanism 86 for switching the movable mirror 30 in accordance with the operation of the film transfer mechanism 64. The movable mirror switching mechanism 86 constitutes movable mirror switching means in the present invention.

In the second embodiment, the film 14 is rewound in the following manner.

Figure 14:
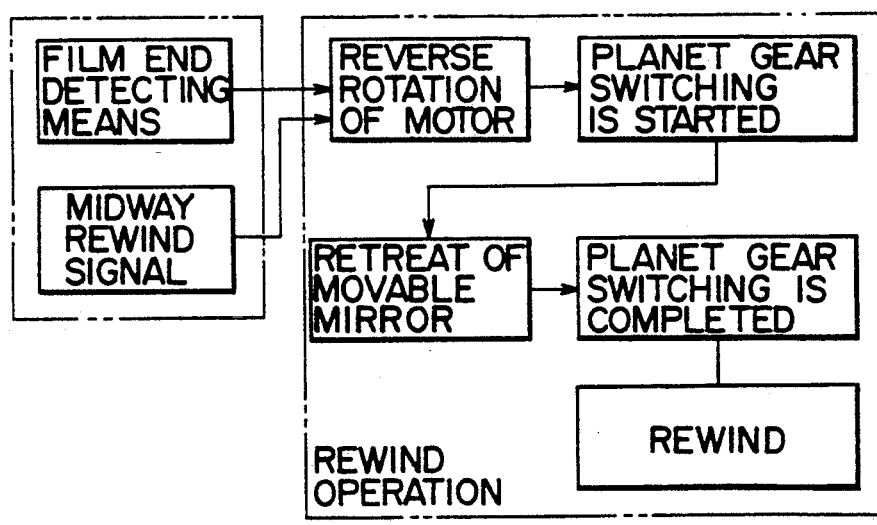

When the terminal end of the film is detected by the film end detecting means or when the midway rewinding switch is depressed, the transfer motor 72 of the film transfer mechanism 64 is reversely driven and the rotational arm 80 and the planet gear 82 are rotated from the winding position to the rewinding position. In this case, if the movable mirror 30 is situated in the first position, it is shifted to the second position while the rotational arm 80 and the planet gear 82 are brought to the rewinding position. After the switching operation is completed, the rewinding of the film 14 is started. FIG. 14 is a flow chart illustrating the film-rewinding operation.

Figure 12:
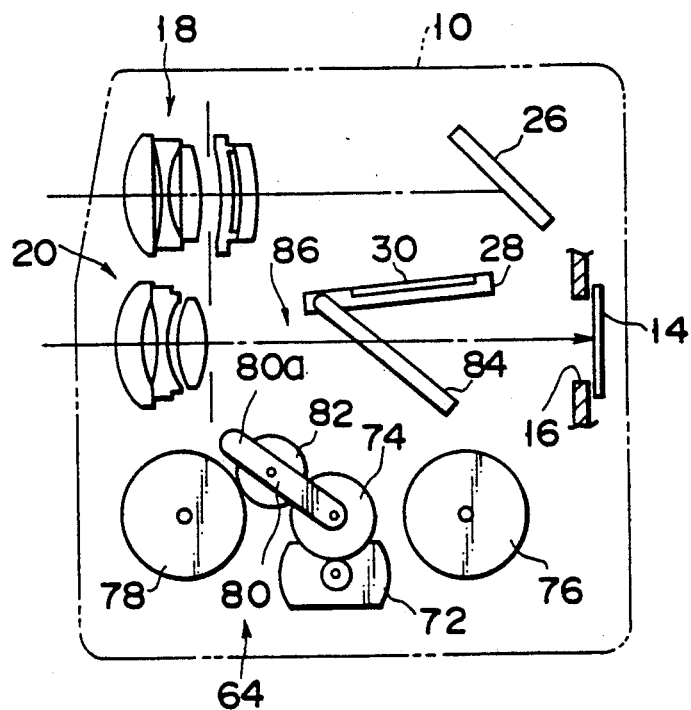

When the film 14 is rewound while the movable mirror 30 is in the second position, as shown in FIG. 12, the movable mirror is not switched and is kept in the second position.

At the time of photographing, the movable mirror 30 is switched by the same switching mechanism as in the first embodiment.

In the above-described second embodiment, the movable mirror 30 is automatically set to the second position, i.e. the position where the reflecting surface is retreated from the front of the exposure opening 16, at the time of the rewind of film 14. Therefore, the same advantages as in the first embodiment can be obtained.

FIGS. 15 to 25 show a bifocal camera according to a third embodiment of the invention. The third embodiment differs from the first embodiment with respect to the structure of the switching mechanism for switching the movable mirror and the finder mechanism. Excepting this, the third embodiment is identical to the first embodiment. In the third embodiment, the same structural elements as in the first embodiment are denoted by the same reference numerals, and detailed descriptions thereof will be omitted.

Figure 17:
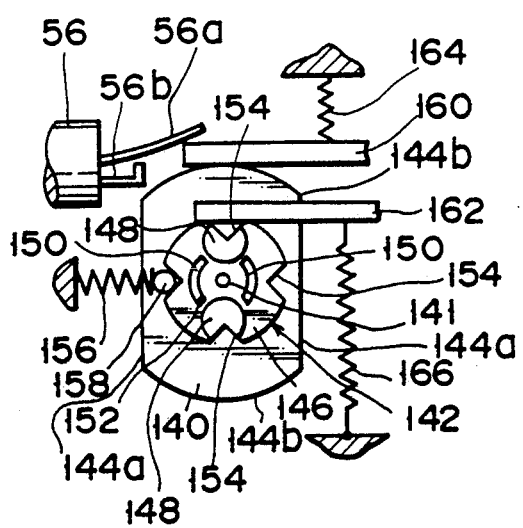

As shown in FIGS. 15 to 17, the switching mechanism 38 comprises a switching motor 48 and a drive gear 52 rotated by the switching motor 48 via a gear system 50. A first cam 140 for switching the movable mirror 30 is secured on the drive gear 52, and a second cam 142 for switching the finder mechanism is mounted on the first cam 140.

The first cam 140 is formed in an oblate shape, and has a cam surface 144 on its outer peripheral surface. The cam surface 144 has a pair of mutually facing parallel flat portions 144a, and a pair of mutually facing arcuated portions 144b which are interposed between the flat portions 144a.

The second cam 142 comprises a disc-like body 146 mounted rotatably about a rotation shaft 141 projecting from the first cam 140, and a pair of push projections 148 formed on an outer peripheral part of the body 146. The push projections 148 extend in parallel to the rotation shaft 141, and are arranged diametrically in respect of the rotation shaft 141. A pair of mutually facing arcuate guide holes 150 are formed in the body 146 between the push projections 148. The arcuated shape of each guide hole 150 is defined around the rotation shaft 141, and the central angle of each guide hole is set to be 90° or more. A guide pin 152 standing on the first cam 140 is inserted into one of the guide holes 150. The guide pin 152 is movable along the guide hole between both ends thereof. Thus, the first and second cams 140 and 142 are movable relative to each other about the rotation shaft 141.

The outer peripheral surface of the body 146 of the second cam 142 has four V-shaped notches 154, which are separated from each other by 90°. Two of the four notches 154 are formed at the same positions as the push projections 148 with respect to the rotation shaft 141. The second cam 142 is elastically positioned by positioning means, which comprises a compression spring 156 attached to the camera body 10, and a ball 158 secured to one end of the compression spring 156 and urged towards the outer peripheral surface of the second cam 142. By fitting the ball 158 in one of the notches 154, the rotation of the second cam 142 is elastically restricted.

The switching mechanism 38 includes a mirror switching arm 160 coupled to the movable mirror 30, and a finder switching arm 162 coupled to the finder mechanism 32. One end portion of the mirror switching arm 160 is urged by a compression spring 164 attached to the camera body 10 and is brought into contact with the cam surface of the first cam 140. The other end portion of the arm 160 is coupled to the support shaft of the movable mirror 30 via a conversion member 161 for converting the linear movement of the arm to rotational movement, and a coupling rod 163. One end portion of the finder switching arm 162 is urged by a tension spring 166 attached to the camera body 10 and is brought into contact with the push projection 148 of the second cam 142. The other end portion of the arm 162 is coupled to the finder mechanism via a conversion member 165 for converting the linear movement of the arm to rotational movement, and a coupling rod 167.

A normally-closed-type detection switch 56 for detecting the position of the movable mirror 30 is provided near the first cam 140. The detection switch 56 has a pair of terminals 56a and 56b. The terminal 56a is located in a movement path of the mirror switching arm 160. As will be described later, when the movable mirror 30 is switched to the first position, the detection switch 56 is turned OFF by means of the arm 160.

FIG. 17 shows the state wherein the movable mirror 30 and the finder mechanism 32 are set in the first position, i.e. the telephotographic mode (T-mode). In this mode, the mirror switching arm 160 is pushed up to the telephotographic position (shown in FIG. 17) by the arcuated portion 144b of the cam surface 144 of the first cam 140. The terminal 56a of the detection switch 56 is pushed by the arm 160, and is separated from the other terminal 56b. Thus, the detection switch 56 is turned OFF. The second cam 142 is kept by the positioning means in the position where the paired push projections 148 aligned in are parallel to the flat portions 144a of the first cam 140. The finder switching arm 162 is pushed up to the telephotographic position (shown in FIG. 17) by one of the push projections 148.

In the state shown in FIG. 17, the guide pin 152 of the first cam 140 is located at the lower end of the guide hole 150 cut in the second cam 142.

When the driving gear 52 and the first cam 140 are rotated in the forward direction by 90° by the switching motor 48, that is, in the counterclockwise direction by 90° about the rotation shaft 141, one of the flat portions 144a of the cam surface 144 faces the mirror switching arm 160. Consequently, the arm 160 is lowered by the compression spring 164 to the wide-angle photographic position, and is brought into contact with the flat portion 144a. Simultaneously, the movable mirror 30 is switched from the first position to the second position by means of the conversion member 161 and the coupling rod 163. Thus, the movable mirror 30 is set to the wide-angle photographic mode (W-mode). The arm 160 is separated from the terminal 56a of the detection switch 56 and, as a result, the detection switch is turned ON.

Figure 18:
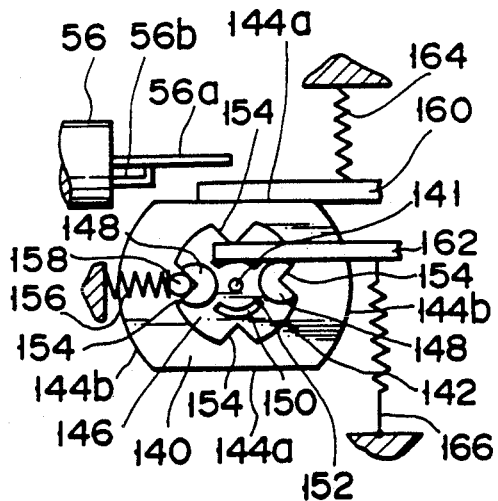

On the other hand, in accordance with the rotation of the first cam 140, the second cam 142 is pushed by the guide pin 152 located at the lower end of the guide hole 150, and is rotated counterclockwise by 90°. Thus, the second cam 142 is positioned such that the paired push projections 148 ar aligned substantially in parallel to the finder switching arm 162, and the second cam 142 is retained in this position by the positioning means. Since the arm 162 is urged by the tension spring 166 towards the push projections 148, the arm 162 is lowered to the wide-angle photographic position, as shown in FIG. 18, in accordance with the movement of the push projections. In this case, the arm 162 shifts the finder mechanism 32 from the first position to the second position via the conversion member 165 and the coupling rod 167. Thus, the finder mechanism 32 is set in the wide-angle photographic mode (W-mode).

When the first cam 140 is rotated by the switching motor 48 in the forward direction by 90° from the state shown in FIG. 18, the second cam 142 is also rotated in the forward direction by 90°, as in the above manner, and the first and second cams are set in the state shown in FIG. 17. Thus, the movable mirror 30 and the finder mechanism 32 are switched from the wide-angle photographic mode to the telephotographic mode.

As stated above, when the drive gear 52 is rotated by the switching motor 48 in the forward direction, the movable mirror 30 and the finder mechanism are switched to the telephotographic mode and the wide-angle photographic mode alternately.

Figure 19:
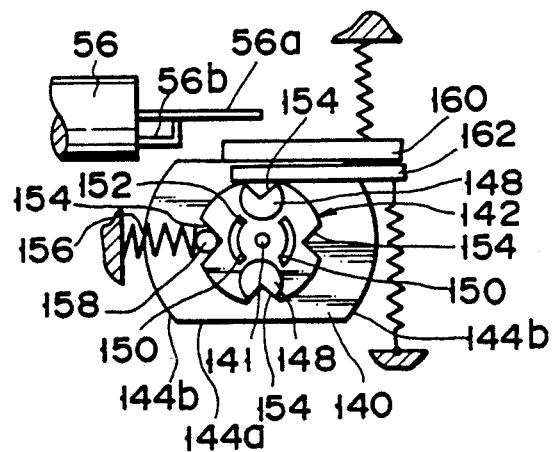

When the drive gear 52 and the first cam 140 are rotated by the switching motor 48 in the reverse direction by 90°, from the state shown in FIG. 17, that is, in the clockwise direction by 90° about the rotation shaft 141, the flat portion 144a of the cam surface 144 faces the mirror switching arm 160, as shown in FIG. 19. Thus, the arm 60 is shifted from the telephotographic position to the wide-angle photographic position, the movable mirror 30 is switched to the wide-angle mode, and the detection switch 56 is turned ON. In this case, the guide pin 152 of the first cam 140 rotates clockwise by 90°, however, the guide pin 152 simply moves from one end to the other in the guide hole 150 and does not push the second cam 142. Thus, The second cam 142 is not rotated and remains in the state shown in FIG. 17. Also, the finder switching arm 162 is retained in the telephotographic position. Namely, only the movable mirror 30 is switched from the telephotographic mode to the wide-angle photographic mode, and the finder mechanism 32 is retained in the telephotographic mode.

Similarly, when the first cam 140 is rotated in the forward direction by 90° from the state shown in FIG. 19, only the movable mirror 30 is switched from the wide-angle photographic mode to the telephotographic mode and is set in the state shown in FIG. 17 once again.

Figure 20:
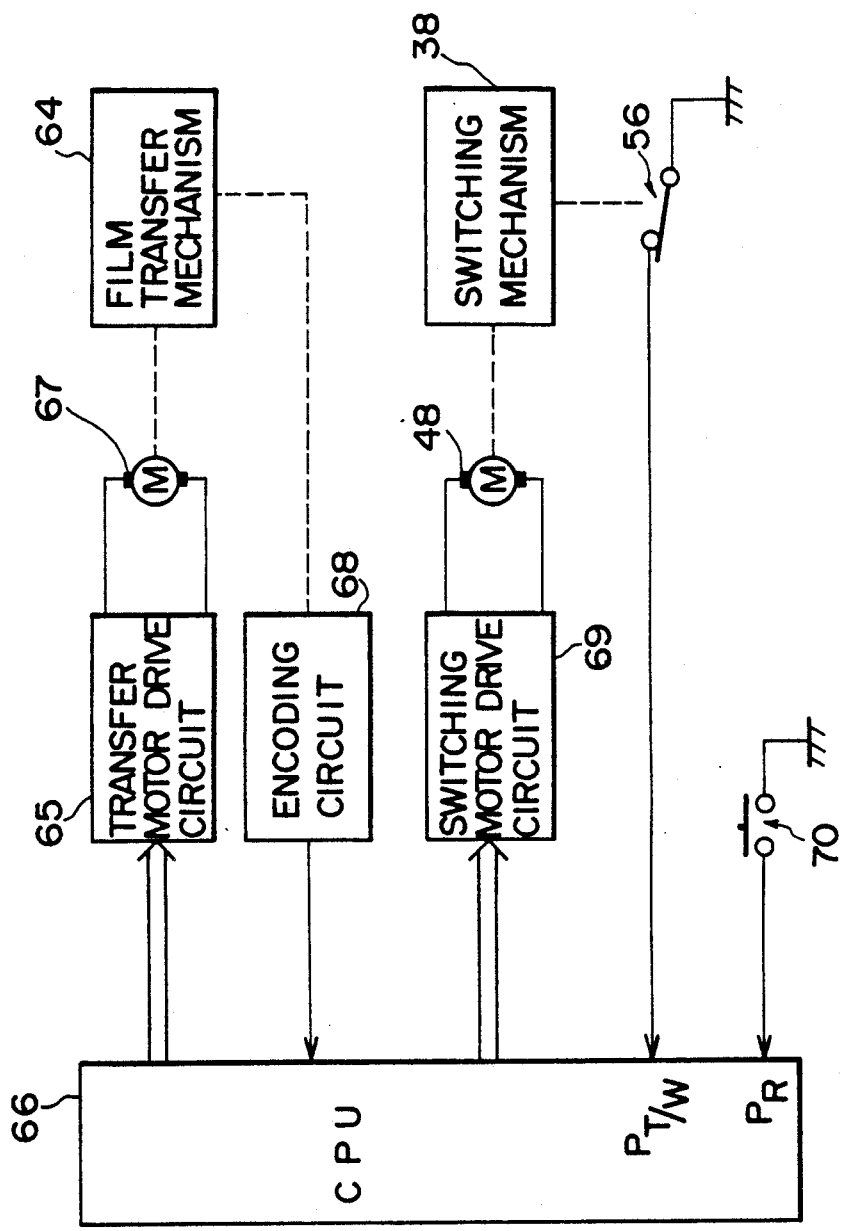

FIG. 20 is a block diagram showing the overall structure of the bifocal camera. The camera has a film transfer mechanism 64 for transferring the film 14 to wind/rewind the film 14. A transfer motor drive circuit 65 drives a transfer motor 67 of the film transfer mechanism 64 on the basis of control signals (a wind signal and a rewind signal) from a CPU 66. An encoding circuit 68 generates a transfer pulse corresponding to the transfer distance of the film and supplies the generated pulse to the CPU 66. A switching motor drive circuit 69 drives the switching motor 48 of the switching mechanism 38 in response to a switching signal from the CPU 66. When the detection switch 56 is closed, a port PT/W of the CPU 66 is set in a low level (L). Further, when a midway rewind switch 70 provided on the outer surface of the camera body 10 is closed, a port PR of the CPU 66 is set in a low level.

The operation of the bifocal camera having the above structure will now be described.

Figure 21:
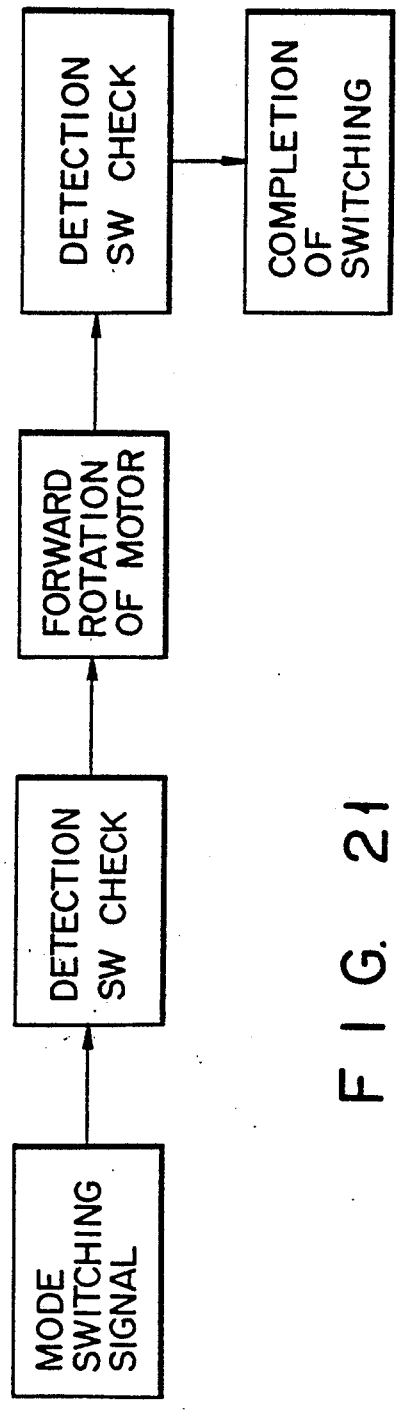

Generally the movable mirror 30 and the finder mechanism 32 are switched upon the depression of a change-over switch (not shown) provided on the outer surface of the camera body 10. When the change-over switch is depressed, the CPU 66 detects the position of the movable mirror 30 and the finder mechanism 32 on the basis of the detection signal from the detection switch 56, and supplies a mode switching signal to the switching motor drive circuit 69. Subsequently, the switching motor 48 of the switching mechanism 38 is rotated in the forward direction, and the movable mirror 30 and the finder mechanism 32 are switched from the telephotographic mode to the wide-angle photographic mode, and vice versa. Then, based on the detection signal from the detection switch 56, the CPU 66 detects the position of the movable mirror 30 and the finder mechanism 32 once again. Thus, the switching operation is completed. FIG. 21 is a flow chart illustrating the switching operation.

The film is wound in the following manner.

Figure 22:
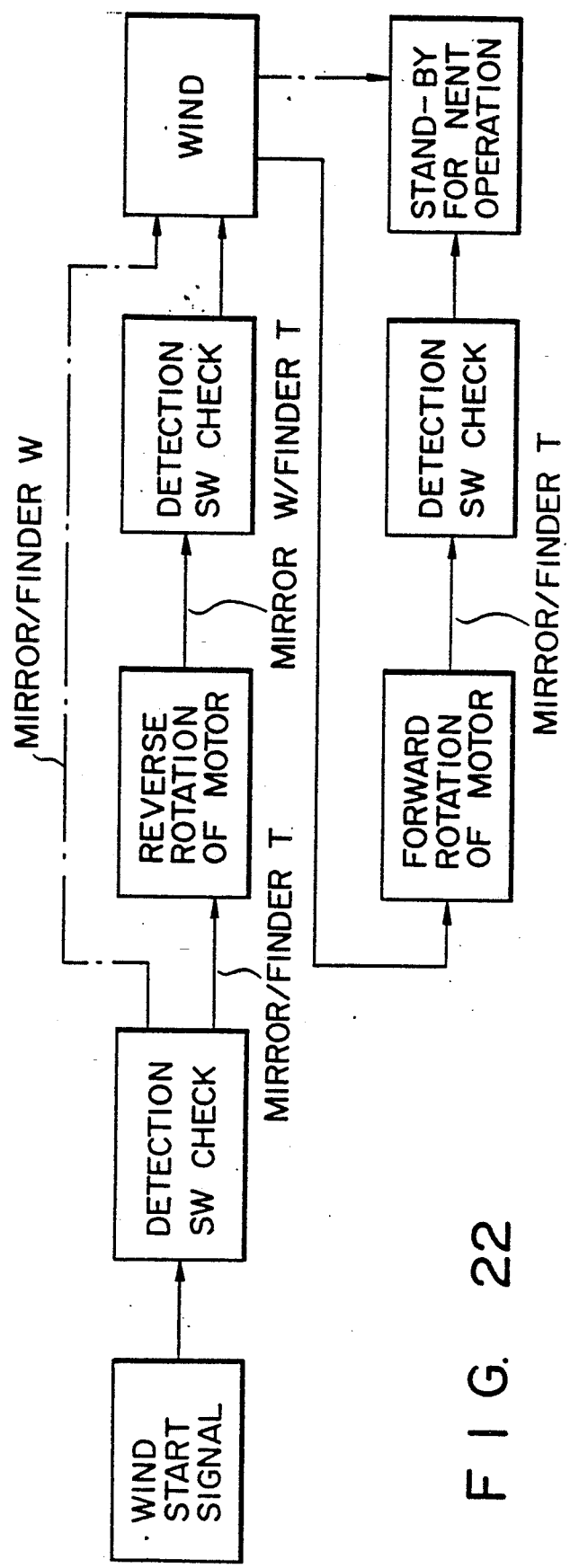

FIGS. 22 and 23 are flow charts for explaining the winding operation.

When a film wind signal is input to the CPU 66, the CPU 66 detects the position of the movable mirror 30 and the finder mechanism 32, on the basis of the detection signal from the detection switch 56. When the movable mirror 30 is in the first position, i.e. in the telephotographic mode, that is, when the port PT/W is not in the low level (L), the CPU 66 rotates the switching motor 48 of the switching mechanism 38 in the reverse direction. Thus, as shown in FIG. 19, only the first cam 140 is reversely rotated by 90°, the movable mirror 30 is switched from the telephotographic mode to the wide-angle photographic mode, and the finder mechanism 32 is retained in the telephotographic mode. Then, the CPU 66 detects the position of the movable mirror 30 once again, on the basis of the detection signal from the detection switch 56. After it is confirmed that the movable mirror 30 is in the wide-angle photographic mode (port PT/W=L), the CPU 66 drives the film transfer mechanism 64 to wind the film 14 by one frame. After the winding operation is completed, the CPU 66 causes the switching motor 48 to rotate in the forward direction. The first cam 140 is rotated in the forward direction by 90°, and the movable mirror 30 is switched from the wide-angle photographic mode to the telephotographic mode. As a result, the movable mirror 30 is set in the state before the winding of the film, as shown in FIG. 17. The switching of the movable mirror 30 is confirmed by the detection signal from the detection switch 56, and the winding operation is completed.

In the case where the movable mirror 30 and the finder mechanism 32 are in the wide-angle photographic mode as a film wind signal is input to the CPU 66, the winding operation of the film 14 is started without changing the mode of the movable mirror.

Figure 24:
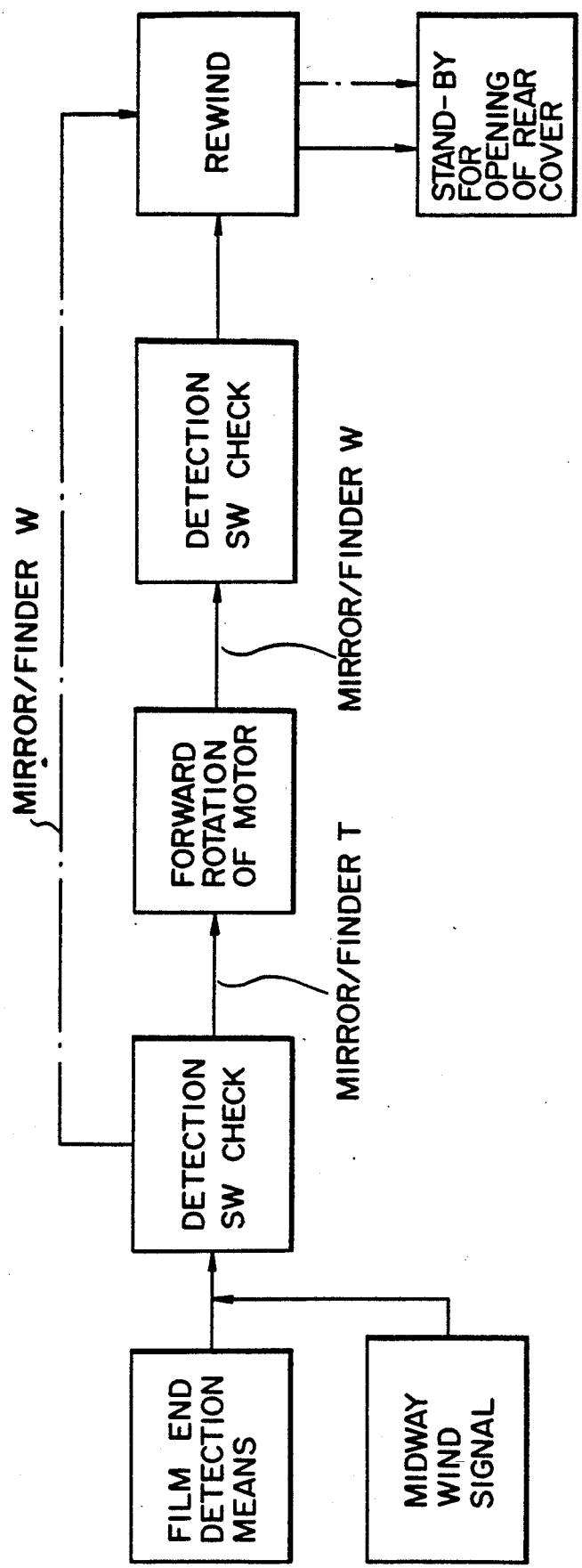

The film 14 is rewound in the following manner. FIGS. 23 and 24 are flow charts for illustrating the rewinding operation.

When the terminal end of the film is detected by conventional film end detecting means, or when the midway rewind switch 70 is depressed and a midway rewind signal is generated, the CPU 66 detects the position of the movable mirror 30 and the finder mechanism 32, on the basis of the detection signal from the detection switch 56. When the movable mirror 30 and the finder mechanism 32 are in the telephotographic mode, that is, when the port PT/W is not in the low level (L), the switching mechanism 48 rotates the first and second cams 140 and 142 in the forward direction by 90° and set the movable mirror and the finder mechanism inthe wide-angle photographic mode. Accordingly, the movable mirror 30 is switched from the first position to the second position. Thereafter, the CPU 66 detects the position of the movable mirror 30 and the finder mechanism 32 once again, on the basis of the detection signal from the detection switch 56. After it is confirmed that the movable mirror 30 and the finder mechanism 32 are in the wide-angle photographic mode, that is, the port PT/W=L, the film transfer mechanism 64 is driven to start the rewinding of the film 14.

In the case where the movable mirror 30 and the finder mechanism 32 are in the wide-angle photographic mode when the terminal end of the film 14 is detected or when the midway rewind signal is input, the rewinding operation is immediately started without changing the mode thereof.

For example, when the rear cover 12 of the camera body 10 is opened to take out or replace the film 14, the movable mirror 30 and the finder mechanism 32 are set to the wide-angle photographic mode by conventional holding means, in interlock with the opening of the rear cover 12.

According to the above-described bifocal camera, if the movable mirror 30 is in the telephotographic mode when the film wind operation or film rewind operation is to be started, that is, when the movable mirror is situated in the first position, the mode of the movable mirror 30 is automatically switched to the wide-angle photographic mode. Thus, while the film is being wound or rewound, the reflecting surface 30a of the movable mirror 30 is retreated from the front of the exposure opening 16 and is retained in the second position. Thus, even if dust particles or the like on the film or emulsion peeled from the film enter the camera body 10 through the exposure opening 16 while the film is being wound, the reflecting surface 30a of the movable mirror 30 is surely protected from such a contaminant. In addition, even if an end portion of the film projects into the camera body 10 through the exposure opening 16 when the rewind of the film is nearly completed, the end portion of the film is prevented from contacting the reflecting surface 30a. Therefore, damage to the movable mirror 30 can be surely prevented. According to the bifocal camera of this embodiment, excellent photographing is ensured for a long time.

In this embodiment, in the case where the movable mirror 30 and the finder mechanism 32 are in the telephotographic mode when the film 14 is to be wound, only the movable mirror 30 is switched to the wide-angle photographic mode, and the finder mechanism 32 is retained in the telephotographic mode. Thus, when the operator winds the film while observing an object through the finder mechanism 32, the visual field of the finder does not vary during the winding operation and the operator is allowed to wind the film naturally. Since the movable mirror 30 is restored to the telephotographic mode immediately after the winding of the film 14 is completed, the telephotographing can be performed subsequently.

The present invention is not limited to the above-described embodiments, and various modifications may be made within the scope of the subject matter of the invention.

For example, in the above embodiments, when the film is rewound in the state wherein the movable mirror and the finder mechanism are in the telephotographic mode, only the movable mirror may be switched to the wide-angle photographic mode and, after the rewinding, may be restored to the telephotographic mode. Also, though the movable mirror and the finder mechanism are switched by the switching mechanism with use of a single motor, two motors may be provided to switch the movable mirror and the finder mechanism separately. The drive source is not limited to the motor. A solenoid, a voltage actuator, or the like may be used as a drive source.

The present invention is not limited to the above-described bifocal camera, and is applicable to a camera having a single photographing optical system, and an optical path changing member for guiding a photographic light beam passed through the photographing optical system to an exposure opening. Also in this case, like the above-described embodiments, the optical path changing member can be protected from contamination or damage.

Additional advantages and modifications will readily occur to those skilled in the art. Therefore, the invention in its broader aspects is not limited to the specific details, representative devices, shown and described herein. Accordingly, various modifications may by without departing from the spirit or scope of the general inventive concept as defined by the appended claims and their equivalents.

What is claimed is:

1. A bifocal camera comprising:
    a first photographic optical system;
    a second photographic optical system arranged substantially in parallel to said first photographic optical system and having a focal length different from a focal length of said first photographic optical system;
    a stationary mirror arranged on an optical axis of said first photographic optical system;
    a camera body containing said first and second photographic optical systems and having an exposure opening situated on an optical axis of said second photographic optical system;
    a movable mirror movable between a first position where said movable mirror interrupts incident light beams passed through said second photographic optical system, and guides incident light beams, which are passed through said first photographic optical system and reflected by said stationary mirror, to the exposure opening, and a second position where said movable mirror interrupts light beams reflected from said stationary mirror, and allows incident light beams from said second photographic optical system to be made incident to the exposure opening; and
    drive means for shifting said movable mirror to the first position and the second position selectively, in response to a mode switching signal, and shifting the movable mirror to the second position in accordance with an operation of rewinding a film.

2. A camera according to claim 1, wherein said first photographic optical system has a focal length longer than that of said second photographic optical system.

3. A camera according to claim 1, which further comprises a finder mechanism designed to be movable between a first position suitable for the focal length of the first photographic optical system and a second position suitable for the focal length of the second photographic optical system,
    wherein said drive means includes finder switching means for shifting said finder mechanism between the first position and the second position, in cooperation with the movement of the movable mirror between the first position and the second position.

4. A camera according to claim 1, wherein said drive means comprises a drive source, a swingable member coupled to said movable mirror and being swingable along with the movable mirror between said first and second positions, and an eccentric member rotated by said drive source and causing said swingable member to swing between the first and second positions.

5. A camera according to claim 4, wherein said eccentric member has a driven member rotated by said drive source in one direction, and an engagement portion provided on said driven member and being engageable with said swingable member.

6. A camera according to claim 4, wherein said drive means includes detection means for detecting the position of said movable mirror, and said detection means includes a detection switch having a first detection position corresponding to the first position of the movable mirror and a second detection position corresponding to the second position of the movable mirror, said detection switch being switched between the first and second detection positions by means of said swingable member.

7. A bifocal camera comprising:
a first photographic optical system;
a second photographic optical system arranged substantially in parallel to said first photographic optical system and having a focal length different from a focal length of said first photographic optical system;
a stationary mirror arranged on an optical axis of said first photographic optical system;
a camera body containing said first and second photographic optical systems and having an exposure opening situated on an optical axis of said second photographic optical system;
a movable mirror movable between a first position where said movable mirror interrupts incident light beams passed through said second photographic optical system, and guides incident light beams, which are passed through said first photographic optical system and reflected by said stationary mirror, to the exposure opening, and a second position where said movable mirror interrupts light beams reflected from said stationary mirror, and allows incident light beams from said second photographic optical system to be made incident to the exposure opening;
detection means for detecting the position of said movable mirror;
drive means for shifting said movable mirror between said first and second positions; and
control means for operating said drive means to move the movable mirror to the second position, in the case where said detection means detects, when a film is to be rewound, that the movable mirror is situated in the first position.

8. A camera comprising:
a camera body having an exposure opening;
a photographic optical system having an optical axis which has no intersection with said exposure opening;
at least two optical-path changing members for guiding incident light beams passed through the photographic optical system to said exposure opening, one of said two optical-path changing members being movable and having a reflecting surface facing said exposure opening;
film transfer means for transferring a film along said exposure opening; and
means for moving said movable optical path changing member to a position where the reflecting surface of the changing member retreats from said exposure opening, when said film transfer means is operated.

9. A camera comprising:
a first photographic optical system having a relatively long focal length;
a second photographic optical system arranged substantially in parallel to said first photographic optical system and having a relatively short focal length;
a finder mechanism designed to be movable between a first position suitable for the focal length of said first photographic optical system, and a second position suitable for the focal length of said second photographic optical system;
a stationary mirror provided on an optical axis of said first photographic optical system;
a camera body having an exposure opening located on an optical axis of said second photographic optical system;
a movable mirror movable between a first position where said movable mirror interrupts incident light beams passed through said second photographic optical system, and guides incident light beams, which are passed through said first photographic optical system and reflected by said stationary mirror, to the exposure opening, and a second position where said movable mirror interrupts light beams reflected by said stationary mirror, and allows incident light beams from said second photographic optical system to be made incident to the exposure opening;
drive means having a first drive system for shifting said movable mirror and said finder mechanism between said first position and said second position, such that the movable mirror and the finder mechanism interlock with each other, and a second drive system for shifting only said movable mirror between the first position and the second position;
means for detecting the position of said movable mirror; and
control means for selectively actuating said first and second drive systems to shift the movable mirror to the second position, in accordance with a detection signal output from said detecting means and in accordance with an operation of winding or rewinding a film.

10. A camera according to claim 9, wherein said control means includes first means for actuating said first drive system to shift the movable mirror and the finder mechanism to the second position, when said detecting means detects the first position of the movable mirror at the time of a start of rewinding the film, and second means for actuating said second drive system to shift the movable mirror to the second position, when said detecting means detects the first position of the movable mirror at the time of a start of winding the film.

11. A bifocal camera comprising:
a first photographic optical system having a relatively long focal length;
a second photographic optical system arranged substantially in parallel to said first photographic optical system and having a relatively short focal length;

a stationary mirror provided on an optical axis of said first photographic optical system;

a camera body having an exposure opening located on an optical axis of said second photographic optical system;

a movable mirror movable between a first position where said movable mirror interrupts incident light beams passed through said second photographic optical system, and guides incident light beams, which are passed through said first photographic optical system and reflected by said stationary mirror, to the exposure opening, and a second position where said movable mirror interrupts light beams reflected by said stationary mirror, and allows incident light beams from said second photographic optical system to be made incident to the exposure opening;

drive means for shifting said movable mirror between the first position and the second position;

means for detecting the position of said movable mirror; and control means for actuating said drive means to shift the movable mirror to the second position, when said detecting means detects the first position of the movable mirror at the time of a start of winding a film.

12. A bifocal camera comprising:

a first photographic optical system;

a second photographic optical system arranged substantially in parallel to said first photographic optical system and having a focal length different from a focal length of said first photographic optical system;

a stationary mirror arranged on an optical axis of said first photographic optical system;

a camera body having an exposure opening situated on an optical axis of said second photographic optical system;

a movable mirror movable between a first position where a reflecting surface of the movable mirror faces said exposure opening and said movable mirror guides an optical image, which is passed through said first photographic optical system and reflected by said stationary mirror, to the exposure opening, and a second position where said reflecting surface retreats from the front of the exposure opening and said movable mirror allows an optical image passed through said second photographic optical system to be made incident to the exposure opening; and movable mirror switching means for shifting the movable mirror to the second position in accordance with an operation of starting the rewinding of a film.

13. A bifocal camera comprising:

a first photographic optical system;

a second photographic optical system arranged substantially in parallel to said first photographic optical system and having a focal length different from a focal length of said first photographic optical system;

a stationary mirror arranged on an optical axis of said first photographic optical system;

a camera body having an exposure opening situated on an optical axis of said second photographic optical system;

a movable mirror movable between a first position where a reflecting surface of the movable mirror faces said exposure opening and said movable mirror guides an optical image, which is passed through said first photographic optical system and reflected by said stationary mirror, to the exposure opening, and a second position where said reflecting surface retreats from the front of the exposure opening and said movable mirror allows an optical image passed through said second photographic optical system to be made incident to the exposure opening;

a finder capable of being switched between a first position suitable for said first photographic optical system, and a second position suitable for said second photographing optical system; and switching means for switching, at the time of photographing, said movable mirror and said finder in interlock with each other between said first position and said second position in response to a mode switching signal, for switching, at the time of starting a film winding operation, said movable mirror to the second position if the movable mirror and the finder are situated in the first position, for switching said movable mirror to the first position after the film has been wound, and for switching, at the time of starting a film rewinding operation, at least said movable mirror to the second position if the movable mirror and the finder are situated in the first position.

14. A bifocal camera comprising:

a first photographic optical system;

a second photographic optical system arranged substantially in parallel to said first photographic optical system and having a focal length different from a focal length of said first photographic optical system;

a stationary mirror arranged on an optical axis of said first photographic optical system;

a camera body having an exposure opening situated on an optical axis of said second photographic optical system;

a movable mirror movable between a first position where a reflecting surface of the movable mirror faces said exposure opening and said movable mirror guides an optical image, which is passed through said first photographic optical system and reflected by said stationary mirror, to the exposure opening, and a second position where said reflecting surface retreats from the front of the exposure opening and said movable mirror allows an optical image passed through said second photographic optical system to be made incident to the exposure opening; and switching means for switching, at the time of photographing, said movable mirror between the first position and the second position in response to a mode switching signal, for switching, at the time of starting a film winding operation, said movable mirror to the second position if the movable mirror is situated in the first position, for switching said movable mirror to the first position after the film has been wound, and for switching, at the time of starting a film rewinding operation, said movable mirror to the second position if the movable mirror is situated in the first position.

15. A bifocal camera comprising:

a first photographic optical system;

a second photographic optical system arranged substantially in parallel to said first photographic optical system and having a focal length different from a focal length of said first photographic optical system;

a stationary mirror arranged on an optical axis of said first photographic optical system;

a camera body containing said first and second photographic optical systems and having an exposure opening situated on an optical axis of said second photographic optical system;

a movable mirror movable between a first position where said movable mirror interrupts incident light beams passed through said second photographic optical system, and guides incident light beams, which are passed through said first photographic optical system and reflected by said stationary mirror, to the exposure opening, and a second position where said movable mirror interrupts light beams reflected by said stationary mirror, and allows incident light beams from said second photographic optical system to be made incident to the exposure opening;

means for shifting said movable mirror between the first position and the second position;

winding means for winding a film;

rewinding means for rewinding the film; and film transfer means including drive means for rotating in one direction at the time of winding the film and in the other direction at the time of rewinding the film, and transmission means for engaging said winding means at the time of winding the film to transmit drive force of said drive means to the winding means, and engaging said rewinding means at the time of rewinding the film to transmit the drive force of the drive means to the rewinding means, said transmission means having switching means for switching said movable mirror to the second position when the winding of the film is to be started in the state wherein the movable mirror is situated in the first position.

16. A camera according to claim 15, wherein said drive means has a drive source and a drive gear rotated by the drive source, said transmission means has a planet gear meshed with said drive gear and being freely movable around the drive gear, said epicyclic gear being engaged with said film winding means when the drive gear is rotated in one direction and engaged with said film rewinding means when the drive gear is rotated in the other direction, and said switching means has a switching arm being swingable about said drive gear along with said planet gear and having an end portion which can be put in contact with said movable mirror.

* * * * *

UNITED STATES PATENT AND TRADEMARK OFFICE
CERTIFICATE OF CORRECTION

PATENT NO. : 4,989,026
DATED : January 29, 1991
INVENTOR(S) : SUZUKI et al

It is certified that error appears in the above-identified patent and that said Letters Patent is hereby corrected as shown below:

Column 20, line 12 (claim 15):

Change "winding" to --rewinding--.

Signed and Sealed this

Third Day of November, 1992

Attest:

DOUGLAS B. COMER

Attesting Officer     Acting Commissioner of Patents and Trademarks